United States Patent Office 3,483,607
Patented Dec. 16, 1969

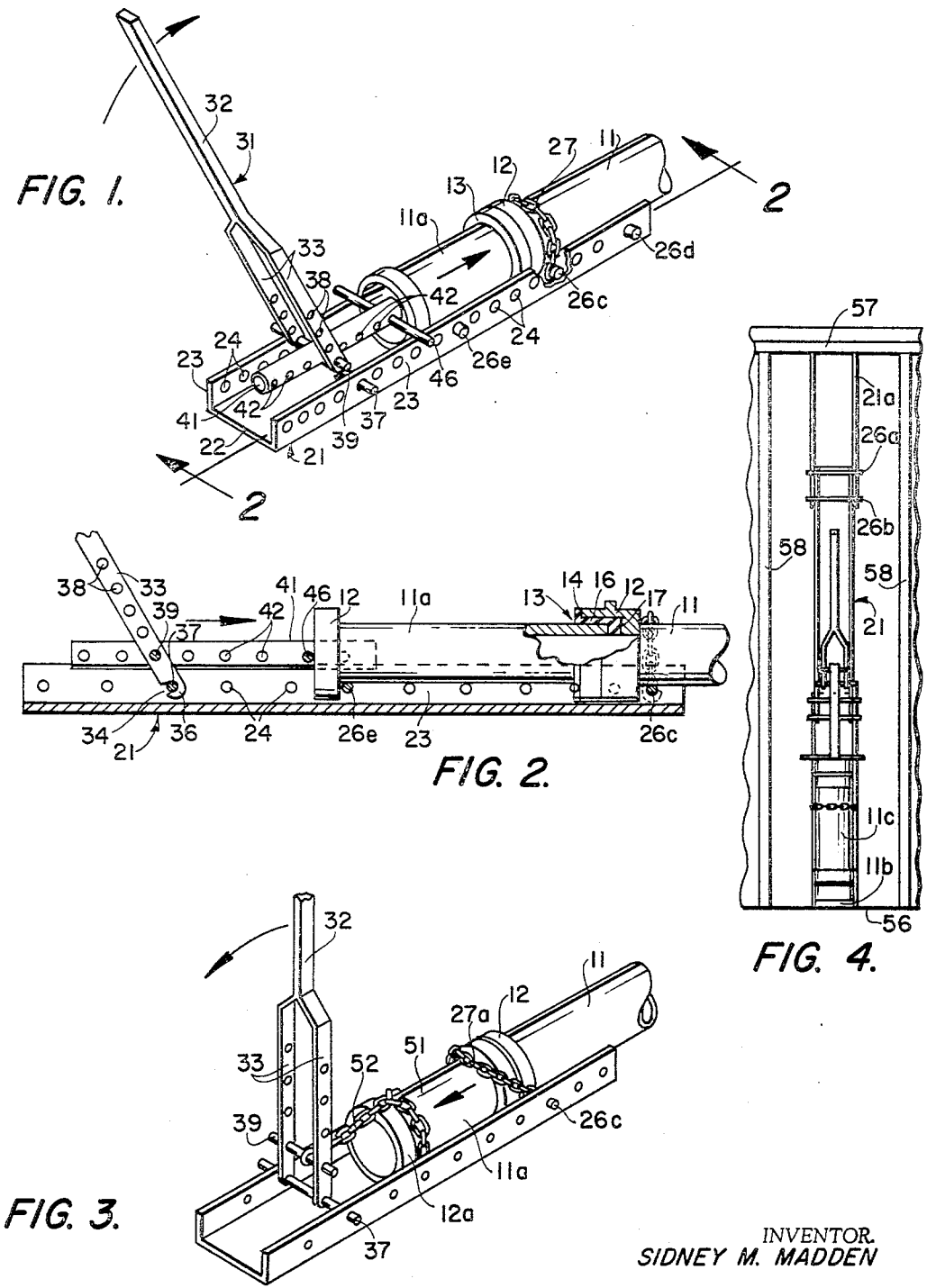

3,483,607
PIPE ASSEMBLY TOOL
Sidney M. Madden, Menlo Park, Calif. (% Bayshore Plumbing Co., 965 Bayshore Blvd., Burlingame, Calif. 94010)
Filed Nov. 13, 1967, Ser. No. 682,244
Int. Cl. B23p 19/04
U.S. Cl. 29—237
6 Claims

ABSTRACT OF THE DISCLOSURE

The tool is used in the assembly and disassembly of commercially available pipes and fittings. One end of each such pipe or fitting has a bell which receives a rubber or synthetic collar; the opposite end is of lesser diameter and is received in the collar of the adjacent pipe or fitting. The tool provides for direct, in-line pushing (or pulling) of the two pipes, eliminating misfitting of the connection due to misalignment.

---

This invention relates to a new and improved tool for assembly and disassembly of pipes. More particularly, the invention relates to a tool which holds in position two pipes or pipe fittings with their axes aligned. In prior tools of this general type there has been a tendency for the male member to stick or jam in the collar so that a proper fitting of the two members is not obtained. The present invention has for one of its principal objects the elimination of such tendency.

Another object of the invention is to provide a convenient means for holding one member stationary while the other member is pushed against it or, when the tool is used to disassemble a joint, to hold one member stationary while the other is pulled away.

A still further feature of the invention is the provision of means to hold pipes and pipe fittings in vertical position such as when a pipe or fitting is being installed in a wall. The tool fits between conventional building studs. Further, the channel portion of the tool is made in various lengths which can be joined together to accommodate different ceiling heights. The same troughs can be used for horizontal installations such as in trenches or whenever the pipe sections are assembled on the floor or ground.

A principal advantage of the present invention is the fact that the tool can be rapidly assembled and disassembled, is of convenient size and readily portable from job to job. One man can readily handle transportation of the tool and operation thereof.

A still further feature of the invention is the fact that different sized pipes may be accommodated, and a wide variety of different pipe fittings may be accommodated.

Other objects of the present invention will become apparent upon reading the following specification and referring to the accompanying drawings in which similar characters of reference represent corresponding parts in each of the several views.

In the drawings:

FIG. 1 is a perspective view to show use of the tool in assembling a pipe joint.

FIG. 2 is a vertical sectional view taken substantially along the line 2—2 of FIG. 1.

FIG. 3 is a view similar to FIG. 1 showing the tool used to disassemble a joint.

FIG. 4 is an elevational view showing the tool used to assemble a joint within a wall structure.

The present invention is used in the assembly and disassembly of commercially available pipes and fittings. Such pipes are available in various lengths and diameters. The fittings may be various types such as T's, elbows, Y's, etc. For convenience of description, the term "pipe" will be used to include both a pipe and a fitting since the structure, for purpose of the present invention, is essentially the same. The first end of each pipe 11 has a hub 12 approximately four inches in length and having an inside diameter somewhat greater than the outside diameter of the main length of the pipe. The opposite end of pipe 11 has no enlargement.

The hub 12 receives a collar 13 which is formed of neoprene or other synthetic or natural rubber. Collar 13 has a flange 14 at one end which has a diameter about equal to the diameter of hub 12. Inwardly of flange 14 the collar is formed as a sleeve 16 which has an inside diameter which is about equal to the outside diameter of pipe 11. A restricted diameter abutment 17 is formed at the inner end of sleeve 16, the abutment having an inside diameter about equal to that of the inside diameter of pipe 11. Abutment 17 limits inward movement of the male end of second pipe 11a forming the joint.

In assembling the joint, collar 13 is first installed inside hub 12 of first pipe 11. Second pipe 11a is then forced inside collar sleeve 11 until it engages the abutment 17 and thus a tight seal is accomplished. It is necessary that when the two pipes 11, 11a are forced together, their axes be accurately aligned and that the pushing force be directed parallel to the common axis. If this is not done, the second pipe 11a tends to stick in collar 13 and a proper joint cannot be obtained. The principal function of the tool which is the subject of the invention is to hold the two pipes 11, 11a in alignment and to exert a push on second pipe 11a which is parallel to the common axis. The tool can also be used to pull the two pipes apart when necessary.

The tool consists of several parts. A trough 21 is provided having a bottom 22 of a width greater than the widest pipe hub 12 to be accommodated and having upturned side edges 23 of a height slightly less than one-half of the diameter of the largest hub being accommodated. At regularly spaced intervals along both edges 23 are a series of holes 24, the holes 24 on the opposite edges being aligned. The length of trough 21 is subject to variation, and a set of troughs may be used, each trough of the set being of a different length. One end of each trough is of restricted width so that the troughs may interfit with their ends overlapped as is shown in FIG. 4, being held parallel to each other by pins 26a, 26b which fit through aligned holes in each of the troughs. In this connection, the lengths of a set of troughs 21 may be four feet, three feet and two feet. The four-foot and three-foot sections, for example, may be connected and fit conveniently between the floor and ceiling of an eight-foot ceiling height. The two-foot section may be added where the ceiling height is 10 feet, etc.

The holes 24 in the troughs received pins 26 not only for the purpose of connecting adjacent sections of troughs together, but also for other purposes which will hereinafter be described in detail. One such pin 26c may be used to secure the ends of a chain 27 which pass from the inside of the trough across the top pipe 11. Different lengths of chain 27 are used for different pipe diameters. As shown in FIG. 1, each chain 27 is installed immediately behind hub 12 of first pipe 11 and this serves to restrain movement of pipe 11 to the right as viewed in FIGS. 1 and 2. As shown in FIG. 3, a longer chain 27a may be used on the opposite side of hub 12 to restrain first pipe 11 when two adjacent pipes are pulled apart. A further function of pins 27 is to support the underside of pipe 11 so that the axis of the pipe 11 is parallel to the bottom of the trough.

Another portion of the apparatus is lever 31. Such lever has a long handle 32 at one end and is formed with a pair of clevis arms 33 at the opposite end. The bottom end of each arm of the clevis is formed with a slot 34 providing a hook which is hooked around a pin 37 in the trough, said pin 37 serving as a pivot for lever 31. Aligned, spaced holes 38 are provided in each arm 33 of the clevis to receive a pin 39.

The connecting link 41 is also used with the apparatus and is here shown in the form of a tube having diametrically aligned holes 42.

In normal operation in joining two pipes 11, 11a together as in a trench or on a horizontal surface, the first pipe 11 is positioned resting in trough 21 supported by at least one pin 26c and preferably a second pin 26d so that it is parallel to the bottom 22 of the trough. A chain 27 is passed around the ends of pin 26c adjacent hub 12 to restrain movement of first pipe 11 to the right. The second pipe 11a is positioned in trough 21 to the left of first pipe 11 resting upon at least one pin 26e. Pivot pin 37 is then installed in trough 21, spaced to the left of the end of the second pipe 11a. The hooks 36 of lever 31 engage said pin 37 in the position best shown in FIG. 2. Thereupon the connecting link 41 is positioned between the clevis arms and pin 39 passed through the holes in both arms 33 as well as a pair of holes 42 in the link. A still further pin 26 is passed through a hole 42 in the end of the link adjacent second pipe 11a. When the workman swings the handle 32 in a clockwise direction as viewed in FIGS. 1 and 2 about pin 37 as a pivot, connecting link 41 is pushed inwardly. Since pin 46 rests on the top edges of the sides 23 of the trough, the movement of link 41 to the right is parallel to the bottom 22 of trough 21 and hence parallel to the axis of the two pipes 11 and 11a. The right-hand end of the second pipe 11a is forced inside the sleeve 16 of the collar 13 until said end engages the abutment 17 in the collar, thus terminating the assembly operation. The various parts of the apparatus can be removed rapidly and conveniently.

When the apparatus is used to disassemble a joint, as shown in FIG. 3, one chain 27a is passed to the left of the hub 12 of the first pipe 11. Connecting link 41 is not used, but a second chain 51 is passed around hub 12a of the second pipe 11a and hooked in such position. The extended length 52 of chain 51 is received in pin 39 passing through the clevis arms 33. The hooks 36 on the end of the clevis arms are turned in a direction opposite that shown in FIG. 2. By pivoting handle 32 in a counterclockwise direction, the pipes 11, 11a are pulled apart.

Referring now to FIG. 4, where the apparatus is used in a vertical installation, two channel sections 21, 21a are connected end to end by pins 26a, 26b and are held in alignment. The total length of the two sections 21, 21a is somewhat less than the distance between floor 56 and ceiling 57 and the troughs conveniently fit between studs 58 spaced in accordance with conventional building practice. The apparatus is used to assemble first pipe 11b and second pipe 11c in essentially the same manner as the first and second pipes 11, 11a, respectively of FIGS. 1 and 2.

What is claimed is:

1. A pipe assembly tool comprising a pipe receiving trough formed at intervals with a plurality of first means receiving first transverse members, pipe restraining means cooperable with one of said first transverse members for restraining movement of a first pipe in said trough longitudinally relative to said trough, a lever engageable with another of said first transverse members to pivot about said last-mentioned transverse member, a connecting link pivotally connected to said lever and having a second transverse member engageable with said trough and with the end of a second pipe in said trough to move said second pipe into engagement with said first pipe.

2. A tool according to claim 1 in which said first means comprises a series of longitudinally spaced holes formed in the sides of said trough and said first transverse members comprise pins dimensioned to extend through holes on opposite sides of said trough.

3. A tool according to claim 1 in which said pipe restraining means comprises a chain fitting over the top of said first pipe and interfitting with one of said transverse members at either end of said chain.

4. A tool according to claim 1 in which said lever is formed as a clevis at its lower end, the clevis formed with spaced apertures, said link also formed with apertures, and a pin through said clevis and link pivotally connecting said link and lever.

5. A tool according to claim 1 in which said link is formed with apertures, said second transverse member passing through an aperture in said link and resting upon the top edges of said trough.

6. A tool according to claim 1 which further comprises a second trough shaped to partially fit within one end of said first-mentioned trough and means for holding said troughs in aligned extending relationship.

References Cited

UNITED STATES PATENTS

| | | | |
|---|---|---|---|
| 870,931 | 11/1907 | Claiborne | 29—237 |
| 968,022 | 8/1910 | Abbott | 254—29 |
| 2,122,099 | 6/1938 | Jeffrey | 254—29 X |

ROBERT C. RIORDON, Primary Examiner

J. C. PETERS, Assistant Examiner

U.S. Cl. X.R.

254—29